Figure 1:
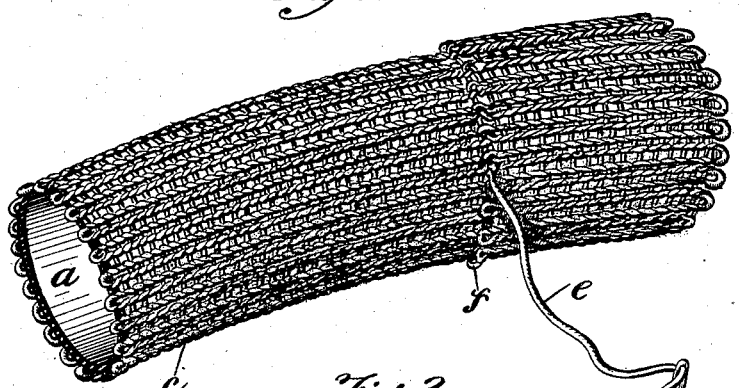

No. 708,953. Patented Sept. 9, 1902.
J. W. BLODGETT.
PNEUMATIC TIRE AND PROCESS OF MANUFACTURING SAME.
(Application filed Jan. 9, 1902.)
(No Model.) 2 Sheets—Sheet 1.

Witnesses:
H. O. Halvorson.
J. B. Weir

Inventor
John W. Blodgett,
by Coburn, McRoberts & McElroy,
his Attorneys.

No. 708,953. Patented Sept. 9, 1902.
J. W. BLODGETT.
PNEUMATIC TIRE AND PROCESS OF MANUFACTURING SAME.
(Application filed Jan. 9, 1902.)
(No Model.) 2 Sheets—Sheet 2.

Witnesses:
Ira D. Perry
J B Weir

Inventor:
John W. Blodgett,
by Coburn, McRoberts & McElroy,
his Attorneys.

UNITED STATES PATENT OFFICE.

JOHN W. BLODGETT, OF CHICAGO, ILLINOIS, ASSIGNOR, BY DIRECT AND MESNE ASSIGNMENTS, TO N. TIRE COMPANY, OF CHICAGO, ILLINOIS, A CORPORATION OF ILLINOIS.

PNEUMATIC TIRE AND PROCESS OF MANUFACTURING SAME.

SPECIFICATION forming part of Letters Patent No. 708,953, dated September 9, 1902.

Application filed January 9, 1902. Serial No. 88,999. (No model.)

*To all whom it may concern:*

Be it known that I, JOHN W. BLODGETT, a citizen of the United States, residing at Chicago, Cook county, Illinois, have invented certain new and useful Improvements in Pneumatic Tires and Processes of Manufacturing the Same, of which the following is a specification.

My invention relates to certain new and useful improvements in pneumatic tires and in the processes of manufacturing the same.

My present invention is concerned, first, with a pneumatic tire in which the body is composed of a tubular knit fabric which has its ends brought together and telescoped and fastened by sewing through the loops forming one end of the tube into and through the loops forming the body of the portion which is telescoped, a method of fastening that is possible with a knit fabric, but not with a woven fabric. The fabric thus formed is saturated with rubber, rubber cement, or some similar suitable material by dipping the tire in cement or putting it on with a brush.

Another feature of my invention consists in a tire, and the process of making the same, made out of knit fabric and having its ends fastened together and embedded by means of a vulcanized cement between an inner or air tube and an outer or tread tube, both formed of vulcanized rubber, so that the tire is formed without heating the fabric, as is necessary where the fabric is first embedded in raw rubber which is subsequently vulcanized.

To illustrate my invention, I annex hereto two sheets of drawings, in which the same reference characters are used to designate identical parts in all the figures, of which—

Figure 2:
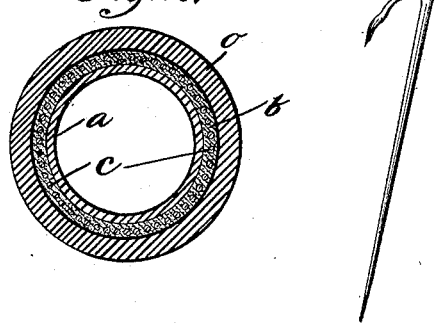
Figure 3:
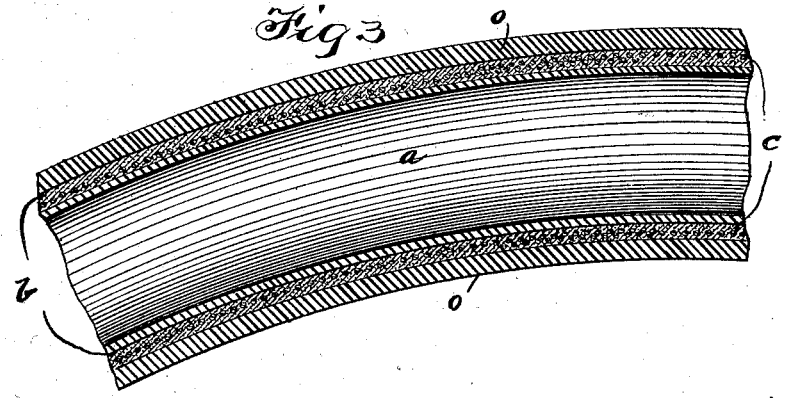
Figure 4:
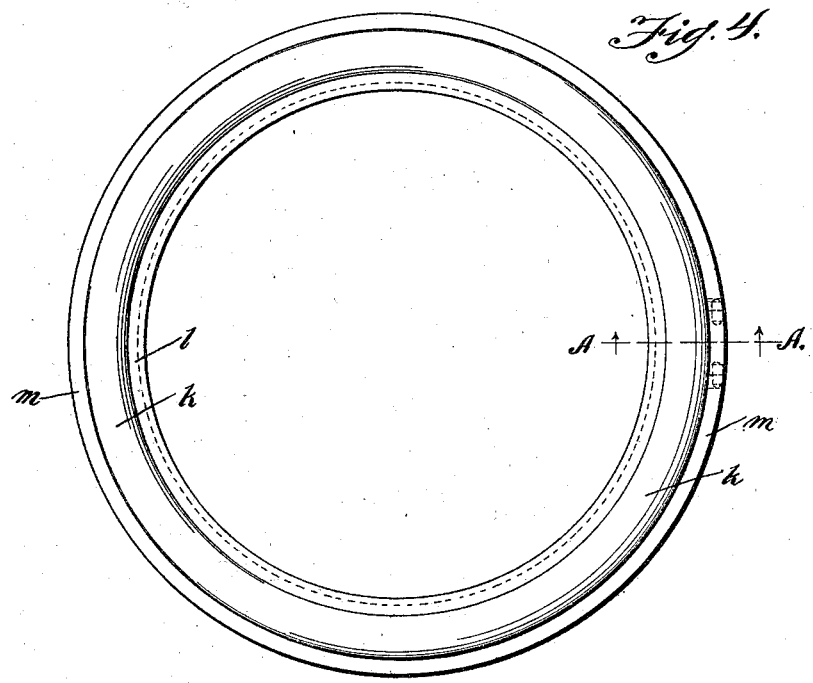
Figure 5:
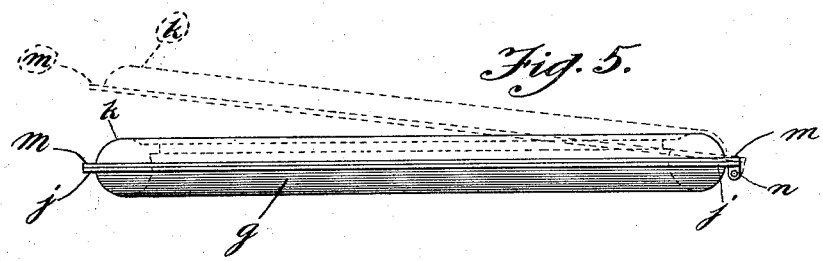
Figure 6:
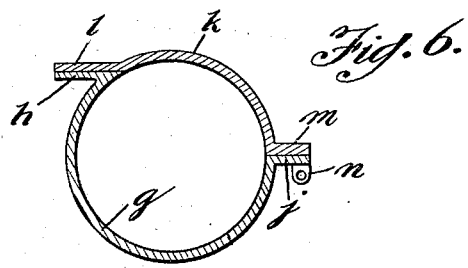

Figure 1 is a perspective view of the telescoped ends of the fabric forming the basis of my improved tire, showing how the ends are telescoped and fastened together. Fig. 2 is a transverse cross-section through the completed tire, showing how the fabric is embedded between layers of cement which in turn are inclosed by the inner and outer vulcanized tubes. Fig. 3 is a similar longitudinal section through the joint. Fig. 4 is a plan view of my new mold. Fig. 5 is a side elevation of the same, and Fig. 6 is a transverse section of the same on the line A A of Fig. 4.

In carrying out my invention I place upon a cylindrical mandrel an air-tube $a$, of vulcanized rubber, and upon the outer surface of this air-tube I place one or more layers of vulcanized cement $b$, made of cured rubber dissolved in naphtha or some similar solvent, and before the cement dries I pass the mandrel through a circular-knitting machine—such as is shown in my application, Serial No. 81,193, filed November 5, 1901—and knit upon the cement-covered outer surface of this air-tube $a$ a tubular fabric $c$, composed of a single thread, which is of a size and material depending upon the strength, resilience, &c., which it is desired to give to the tire when it is completed. When the length of a tire has been knit, a small additional portion of the fabric, as indicated at $d$ in Figs. 1 and 3, is knit without being cemented onto the inner tube. The inner tube thus coated with cement and having the fabric tube $c$ knit thereon is then removed from the cylindrical mandrel, preferably by blowing air between the body of the mandrel and the inner surface of the tube $a$, so that the mandrel can be readily removed. The end $d$ of the fabric is now telescoped over the other end, which has been previously saturated and coated with a fresh layer of cement, and the ends are then joined together by a cord $e$, which is stitched or passed through the loops $f$, constituting the outer ends of the end $d$, and through the adjacent loops, constituting the body portion of the tube beneath it. With the knit fabric having the loops this process of sewing or stitching the overlapped ends of the tire without puncturing the tube $a$ is easily accomplished; but it will be apparent that it would be utterly impossible to thus sew the overlapped ends of the ordinary woven fabrics which have been hitherto employed in constructing tires of the general type, and as a consequence it has hitherto been necessary to bring these woven fabrics end to end and join them by cementing extra pieces of fabric over the joints. The endless tube thus formed is then coated with one or more layers of cement, and the whole is placed in a tire-mold, which is preferably of the construction shown in Figs. 4 to 6, where it will be seen to consist of the lower half g, which is in the form of an annulus having the circular groove therein extending over considerably more than one hundred and eighty degrees and preferably formed with the flanges h and j thereon to give additional stiffness to the mold and prevent its becoming bent or warped. Coöperating with this annulus g to make a complete annulus having a circular cross-section is the upper annulus k, which has the same interior curve as the annulus g and which is provided with the flanges l and m, coöperating with the flanges h and j, respectively. The flanges j and m are hinged together at one side, as at n, and the opposite side of the mold will be provided with fastening means to hold the flanges together. The object of using this particular form of a tire-mold in carrying out my present invention is because the tubes of fabric are very elastic and are made somewhat shorter than the completed tire, and if the interior surfaces of the tire-mold extend through only one hundred and eighty degrees it is difficult to hold the tire in place in the mold while the halves are being brought together. With the lower half extending over more than one hundred and eighty degrees, as shown in Fig. 6, the tire can be stretched in the mold, and it remains in place there without any difficulty until the lid is brought down and clamped in place. Of course the valve has been placed on the air-tube before the ends are telescoped, and the partially-completed tire thus formed is placed in the mold and very strongly inflated. This inflation serves to force the cement b thoroughly through the interstices of the fabric and also through the fibers thereof, completely driving all air out of the fabric and cement, the air escaping through the joints of the tire-mold. The tire is then removed and freshly coated with two coats of cement, and the outer layer o, of vulcanized rubber, after having two coats of cement put on its inner surface is put in place and cemented on. This outer layer o is of any thickness that may be required for the purpose for which the tire is to be used, and when it has been cemented in place and the cement dried the tire is ready for use.

While I have herein shown and described a novel mold for use in manufacturing tires, I do not herein claim the same, but reserve the subject-matter thereof for a divisional application.

While I have shown my invention as embodied in the forms and carried out by the processes which I at present consider best adapted to perfect the same, it will be understood that they are capable of modifications and that I do not desire to be limited in the interpretation of the following claims except as may be necessitated by the state of the prior art.

What I claim as new, and desire to secure by Letters Patent of the United States, is—

1. As a new article of manufacture, a pneumatic tire having a tube of knit fabric embedded therein and its ends brought together and overlapped and secured by uniting the loops of the telescoped end with the adjacent loops of the inner portion; substantially as described.

2. As a new article of manufacture, a pneumatic tire composed of inner and outer vulcanized tubes connected by a thick layer of vulcanized cement in which is embedded a tube of knit fabric having its ends brought together and secured by the loops of the fabric; substantially as described.

3. As a new article of manufacture, a pneumatic tire composed of inner and outer vulcanized tubes connected by a thick layer of vulcanized cement in which is embedded a tube of knit fabric having its ends brought together and telescoped and secured by uniting the loops of the overlapping end with the adjacent loops of the inner portion; substantially as described.

4. In the art of making pneumatic tires, the process which consists of covering the inner vulcanized air-tube placed upon a mandrel with a coating of vulcanized cement; of knitting a tube of fabric upon said cement-coated air-tube; of placing an additional layer of vulcanized cement upon said tube of fabric; in placing the tube thus formed in a tire-mold and inflating it strongly; in coating it with cement again after it is removed; and in placing an outer tube of vulcanized rubber thereon to be secured to the inner tube by said cement; substantially as decsribed.

In testimony whereof I affix my signature in presence of two witnesses.

JOHN W. BLODGETT.

Witnesses:
JOHN H. McELROY,
HATTIE O. HALVORSON.